United States Patent
Elliott et al.

(10) Patent No.: US 8,533,776 B2
(45) Date of Patent: Sep. 10, 2013

(54) METHOD AND SYSTEM FOR BINDING A DEVICE TO A PLANAR

(75) Inventors: Scott T. Elliott, Rolesville, NC (US); James P. Hoff, Wake Forest, NC (US); Scott Long, Chapel, NC (US); James P. Ward, Raleigh, NC (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 3254 days.

(21) Appl. No.: 09/952,493

(22) Filed: Sep. 14, 2001

(65) Prior Publication Data

US 2003/0056109 A1    Mar. 20, 2003

(51) Int. Cl.
*G06F 7/04* (2006.01)

(52) U.S. Cl.
USPC ............. 726/2; 726/34; 726/35; 713/194

(58) Field of Classification Search
USPC ......... 713/2, 166, 167, 179, 192, 200, 202, 713/164, 168, 194; 714/11, 39; 463/29, 463/31; 726/30, 2, 34–35, 26–27; 705/35, 705/55, 56; 710/62–64
See application file for complete search history.

(56) References Cited

U.S. PATENT DOCUMENTS

| | | | |
|---|---|---|---|
| 5,070,479 A * | 12/1991 | Nakagawa | 714/11 |
| 5,357,604 A * | 10/1994 | San et al. | 463/31 |
| 5,574,915 A | 11/1996 | Lemon et al. | |
| 5,599,231 A * | 2/1997 | Hibino et al. | 463/29 |
| 5,754,761 A | 5/1998 | Willsey | |
| 5,805,712 A | 9/1998 | Davis | |
| 5,818,939 A | 10/1998 | Davis | |
| 6,185,546 B1 | 2/2001 | Davis | |
| 6,185,678 B1 | 2/2001 | Arbaugh et al. | |
| 6,199,167 B1 * | 3/2001 | Heinrich et al. | 726/18 |
| 6,199,194 B1 * | 3/2001 | Wang et al. | 717/118 |
| 6,425,079 B1 * | 7/2002 | Mahmoud | 713/2 |
| 7,984,303 B1 * | 7/2011 | Ma et al. | 713/186 |
| 2002/0023032 A1 * | 2/2002 | Pearson et al. | 705/35 |
| 2002/0023212 A1 * | 2/2002 | Proudler | 713/164 |
| 2002/0083332 A1 * | 6/2002 | Grawrock | 713/200 |

OTHER PUBLICATIONS

TCPA PC Specific Implementation Specification, Version 1.00, Sep. 9, 2001, p. 1-70.*

* cited by examiner

*Primary Examiner* — Yin-Chen Shaw
(74) *Attorney, Agent, or Firm* — Sawyer Law Group, P.C.

(57) ABSTRACT

A method and system for binding a device to a planar is disclosed. According to the preferred embodiment of the method and system of the present invention, a programmable memory chip is provided on the planar and the device is detachably attached to the planar. The method and system further includes using the programmable memory chip to bind the device to the planar.

Through the aspects of the present invention, the programmable memory chip transmits a message associated with the planar to the device, which is programmed to receive the message associated with the planar. If the message received by the device is not the message associated with the planar, the device is disabled.

10 Claims, 2 Drawing Sheets

100

METHOD AND SYSTEM FOR BINDING A DEVICE TO A PLANAR

FIELD OF THE INVENTION

The present invention relates generally to computer systems and, more particularly, to a method and system for binding a device to a planar in a computer system.

BACKGROUND OF THE INVENTION

As computer systems become more powerful, new functions are continually being developed and added to the systems. One such function is an embedded security system ("ESS") that provides system security measures outside of the operating system. As is shown in FIG. 1, the ESS 20 is typically a chip that is soldered onto a planar 12, such as a motherboard, in the computer system 10. The ESS 20 preferably is associated with the planar 12, i.e., the ESS 20 is not transferable from one planar 12 to another, and one function of the ESS 20 is to verify the identity of the planar 12.

While providing added functionality, the ESS 20 is not always required in a computer system 10. For instance, the planar 12 is utilized in a variety of consumer products, such as, personal computers, mobile phones, and hand held electronic devices, which do not necessarily require the added security measures provided by the ESS 20. Indeed, the inclusion of the ESS 20 in such products could be cost prohibitive.

One solution would be to provide a removable ESS 20, where the ESS 20 can be optionally plugged into, as opposed to being soldered onto, the planar 12 if needed by the customer. In this way, the planar 12 can be utilized with or without the ESS 20. While this provides greater flexibility for the customer, it presents potential problems when the ESS 20 is included.

As stated above, the ESS 20 is typically soldered onto the planar 12. Thus, the ESS 20 is physically bound to the planar 12, and an intruder cannot tamper with the ESS 20 without damaging the planar 12. Nevertheless, if the ESS 20 is removable, i.e., not permanently bound to the planar, the intruder can remove the ESS 20 and replace it with one that would allow the intruder to gain access to the computer system. This type of security breach could jeopardize the contents of the computer system, which are oftentimes sensitive and confidential.

Accordingly, a need exists for a binding a device to a planar, where the device is removable, i.e., not permanently bound to the planar. The present invention addresses such a need.

SUMMARY OF THE INVENTION

The present invention provides a method and system for binding a device to a planar. According to the preferred embodiment of the method and system of the present invention, a programmable memory chip is provided on the planar and the device is detachably attached to the planar. The method and system further includes using the programmable memory chip to bind the device to the planar.

Through the aspects of the present invention, the programmable memory chip transmits a message associated with the planar to the device, which is programmed to receive the message associated with the planar. If the message received by the device is not the message associated with the planar, the device is disabled. Thus, if the device is replaced or removed and placed into another planar, i.e. unbound, the device will be inoperable.

Because the method and system of the present invention is a hardware solution, as opposed to a software solution, an intruder cannot interfere with the binding verification process. Moreover, because binding is not performed by BIOS, which is accessible through the operating system, no one, including the intruder, can alter the binding verification process.

DETAILED DESCRIPTION

The present invention relates generally to computer systems and, more particularly, to a method and system for binding a device to a planar in a computer system. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

In the preferred embodiment of the present invention, a low cost programmable memory chip, such as an EPROM, is added onto the planar and coupled directly to the removable device through a serial interface. The EPROM has only one function, and that is to transmit a programmed message associated with the planar to the device, which also is programmed to receive the message associated with the planar. If the device does not receive the programmed message associated with the planar, it will become inoperative. Thus, the benefits of binding the device to the planar are achieved without binding the device permanently onto the planar, i.e., the device is removable.

By coupling the EPROM to the device via a serial interface, the binding verification process is isolated from the computer's operating system. In so doing, the computer system cannot interfere with the binding verification process because it does not have access to the serial interface. Thus, an intruder cannot launch a software application, such as a trojan horse virus, to disrupt the binding process, nor can he or she hack into the hardware components. For similar reasons, unlike other systems that perform a binding process in BIOS, the system and method according to the present invention intentionally avoids using BIOS or any memory space or device accessible by the operating system for the binding process. Accordingly, the present invention offers a high level of privacy and security.

Figure 1:
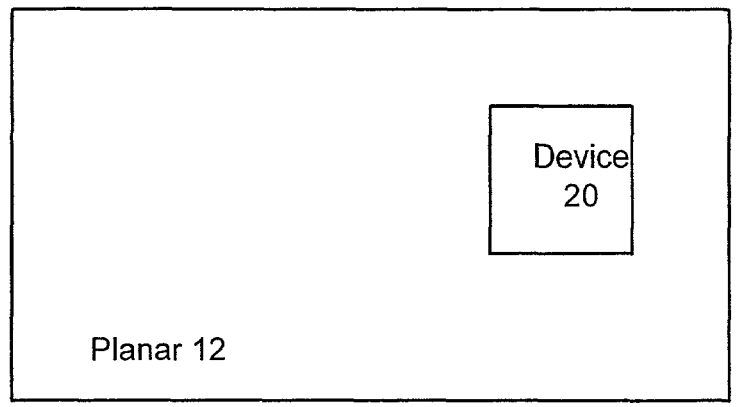
FIG. 1 illustrates a block diagram of a computer system.
Figure 2:
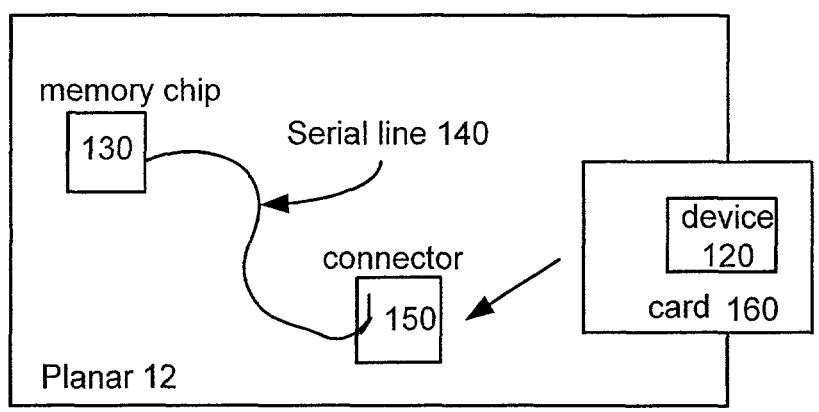
FIG. 2 illustrates a block diagram of a computer system that can utilized in accordance with one preferred embodiment of the present invention.

FIG. 2 illustrates a computer system that can be utilized in the preferred embodiment of the present invention. As is shown, the computer system 100 includes a planar 12. On the planar 12, a programmable memory chip 130, such as an EPROM, is provided. In addition to the memory chip 130, the planar 12 includes a connector 150 coupled to the memory chip 130 via a serial line 140. The connector 150 is adapted to receive an adapter card 160, onto which a device 120 is coupled. In one preferred embodiment, the device 120 is an ESS. The serial line 140 and connector 150 serve to provide a serial interface between the memory chip 130 and the device 120.

As stated above, the serial line 140 and connector 150 are isolated from the operating system. Communication between the memory chip 130 and the device 120 is private and independent from the operating system (not shown) or any public bus (not shown). Thus, the binding verification process is isolated and secure.

Figure 3:
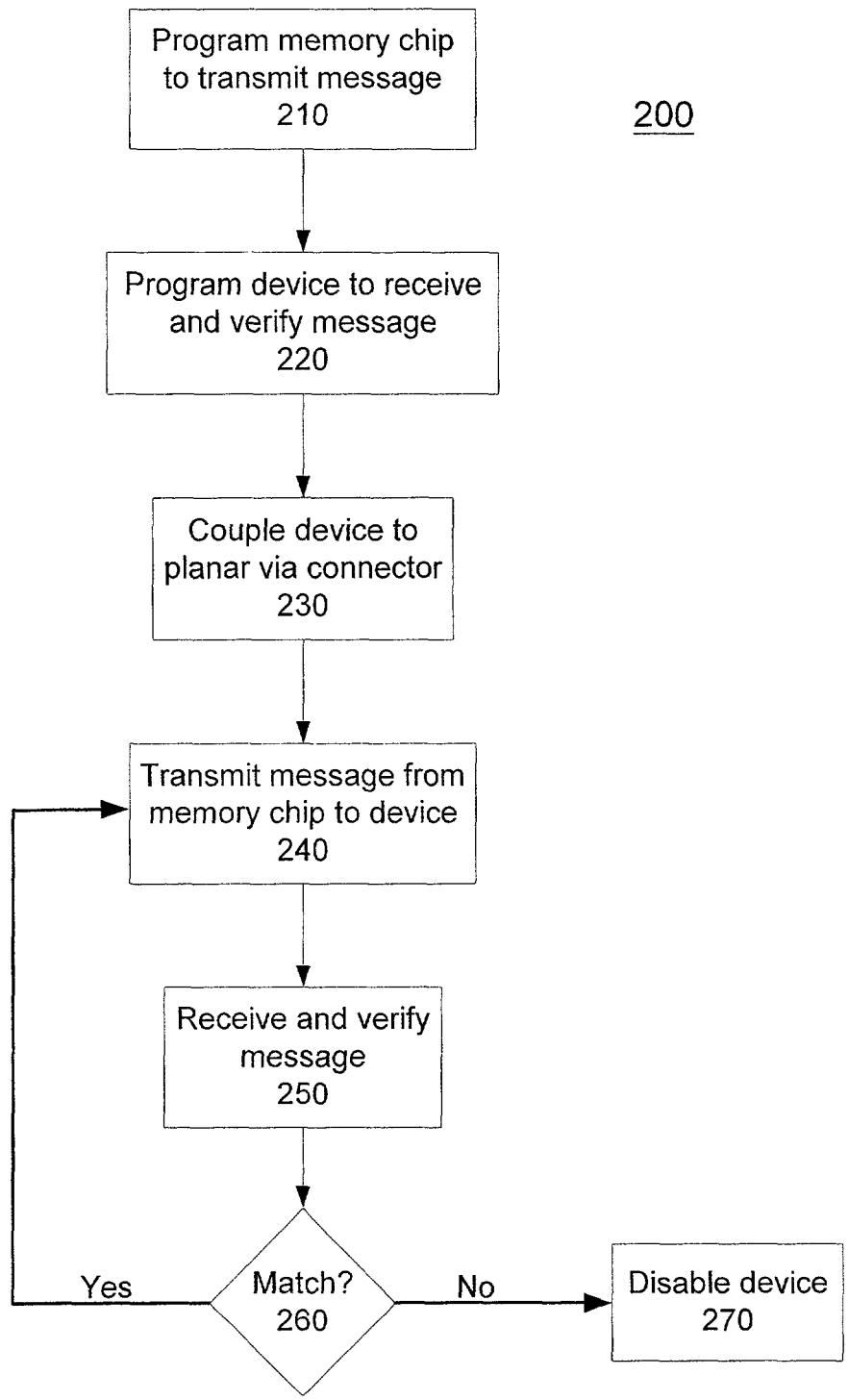
FIG. 3 is a flowchart illustrating the binding verification process in accordance with a preferred embodiment of the present invention.

For a better understanding of the binding verification process, please refer to FIG. 3, which is a flowchart according to the preferred embodiment of the present invention. The process 200 starts at step 210 where the programmable memory chip 130 is programmed to transmit the message associated with the planar 12. At or near the same time, in step 220, the device is programmed to receive and verify the message associated with the planar 12. The programming steps 210 and 220 preferably take place at the time of manufacturing the planar 12 for the customer, so that the memory chip 130 and the device 120 can be programmed to receive and transmit, respectively, the same message. In a preferred embodiment, the message is a unique serial number associated with the planar 12.

Referring again to FIG. 3, once the device 120 has been programmed (step 220), the device 120 is coupled to the planar 12 via the connector 150 in step 230. Next, in step 240, the memory chip 130 transmits the message associated with the planar 12 to the device 120 via the serial line 140. The device 120 receives and verifies the message in step 250. In step 260, the device 120 determines whether the message received matches the programmed message associated with the planar 12. If the messages match, the process loops back to step 240 for continuous monitoring.

If, however, the messages do not match, then there is a presumption that the device 120 has been removed and placed into second planar (not shown). In such a situation, the second planar would include a second programmable memory chip, programmed to transmit a message associated with the second planar. Clearly, the message associated with the second planar would not match the programmed message in the device 120, which originated from the first planar 12. Under such circumstances, the device 120 would disable itself and become inoperable in step 270. Thus, the device 120 can only be used in the planar 12 with which it is associated, i.e., the device 120 is bound to the planar 12.

In another preferred embodiment, the programmable memory chip 130 transmits the message periodically, e.g. once every minute. By transmitting periodically, as opposed to continuously, the memory chip 130 consumes less energy and prolongs the life of its battery (not shown). In addition, the device 120 is not required to monitor continuously for the message.

Through aspects of the present invention, the planar accommodates devices that require to be bound to the planar, without permanently binding the device to the planar, by adding a programmable memory chip, such as an EPROM, to the planar. The cost of adding the EPROM is minimal and therefore does not significantly increase the overall cost of manufacturing the planar without the device. Thus, the customer can have the option of the planar with or without the device.

If the customer chose the planar with the device, the system and method according to the present invention would bind the device to the planar without permanently attaching it to the planar. The system and method of the present invention also provides a private and secure binding verification process by implementing a hardware solution isolated from the computer's operating system. In so doing, the computer system cannot interfere with the binding verification process because it does not have access to the communication path between the memory chip and the device. Thus, an intruder cannot launch a software application, such as a trojan horse virus, to disrupt the binding process, nor can he or she hack into the hardware components.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for binding a device to a planar comprising:
providing a programmable memory chip on the planar, wherein the providing further includes:
programming the memory chip to transmit a message associated with the planar;
detachably attaching the device to the planar, wherein the detachably attaching further includes providing a connector on the planar for receiving the device, wherein the connector is coupled to the memory chip via a serial interface; and
binding the device to the planar using the memory chip, wherein the binding further includes transmitting the message associated with the planar by the memory chip to the device via the serial interface; and verifying the message by the device, wherein the device is programmed to accept only the message associated with the planar, wherein the bound device can only be used in the planar and no other planar.

2. The method of claim 1 further including:
disabling the device if the message is not associated with the planar.

3. The method of claim 1, wherein the transmitting further includes:
transmitting the message periodically.

4. The method of claim 1, wherein the message associated with the planar is a unique serial number associated with the planar.

5. A system for binding a device to a planar comprising:
a programmable memory chip on the planar, wherein the programmable memory chip is programmed to transmit a message associated with the planar; and
a connector coupled to the memory chip for detachably attaching the device to the planar, wherein the connector is coupled to the memory chip via a serial interface, wherein the memory chip binds the device to the planar and the bound device can only be used in the planar and no other planar, wherein the message associated with the planar by the memory chip is transmitted to the device via the serial interface; and wherein the message is verified by the device, wherein the device is programmed to accept only the message associated with the planar.

6. The system of claim 5, wherein the device is programmed to accept only the message associated with the planar.

7. The system of claim 6, wherein the connector provides a serial interface between the memory chip and the device.

8. The system of claim 7, wherein the memory chip transmits the message associated with the planar to the device via the serial interface.

9. The system of claim 6, wherein the device is disabled if the device receives a message not associated with the planar.

10. The system 5, wherein the message associated with the planar is a unique serial number associated with the planar.

\* \* \* \* \*